May 28, 1940.  J. P. BYRNE, JR  2,202,443
MOWER ATTACHMENT
Filed March 30, 1939   2 Sheets-Sheet 1
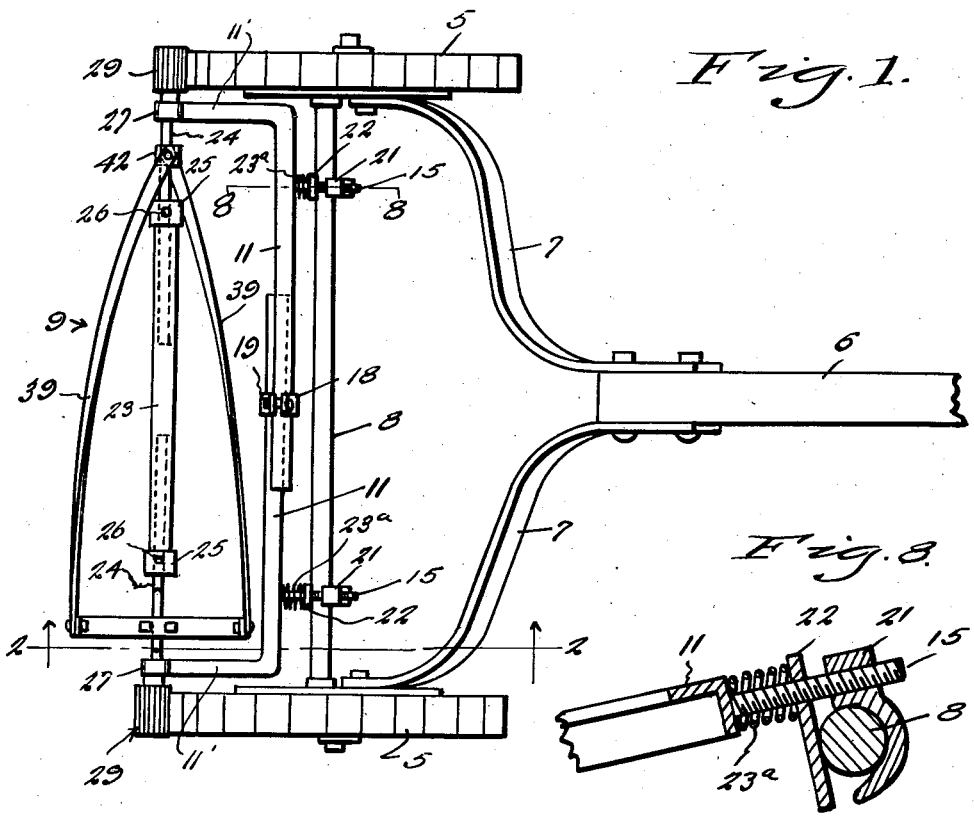
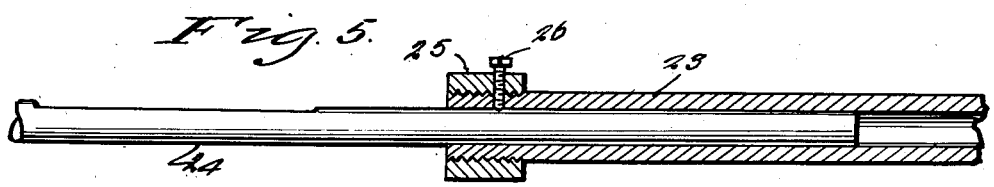
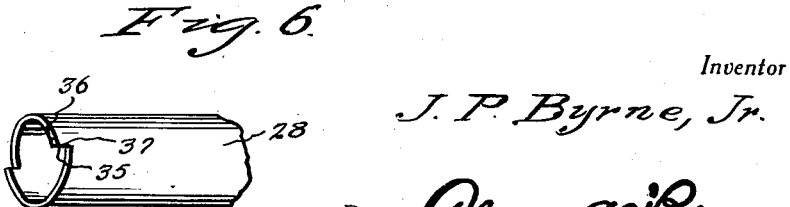
Inventor
J. P. Byrne, Jr.
By Clarence A. O'Brien
and Hyman Berman
Attorneys May 28, 1940.   J. P. BYRNE, JR   2,202,443
MOWER ATTACHMENT
Filed March 30, 1939   2 Sheets-Sheet 2
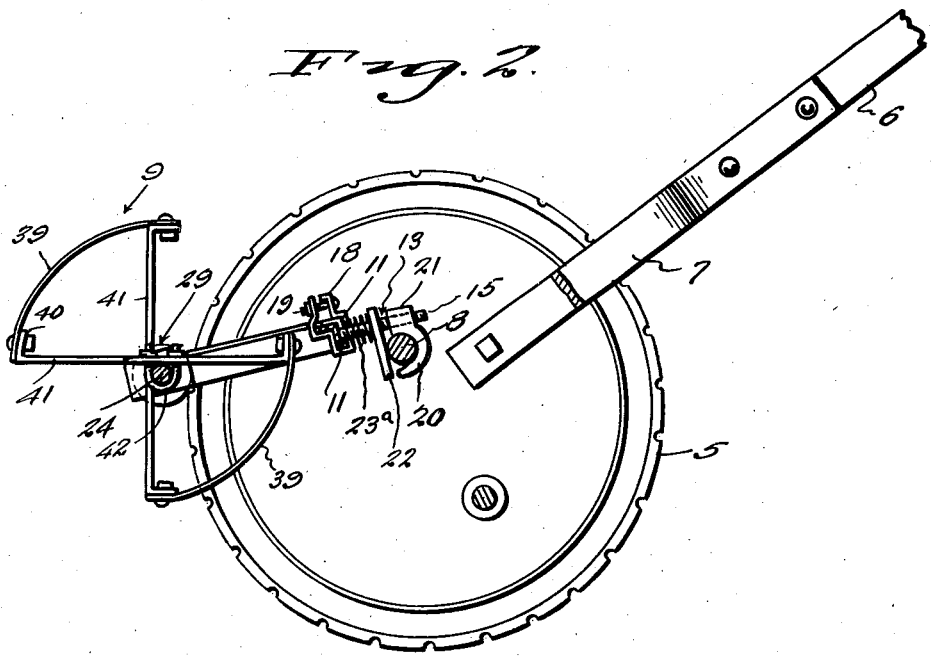
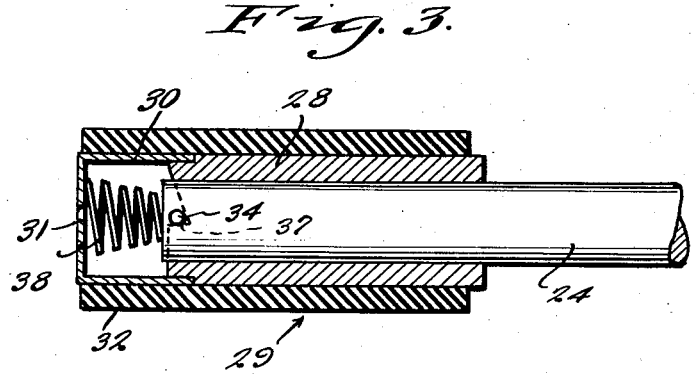
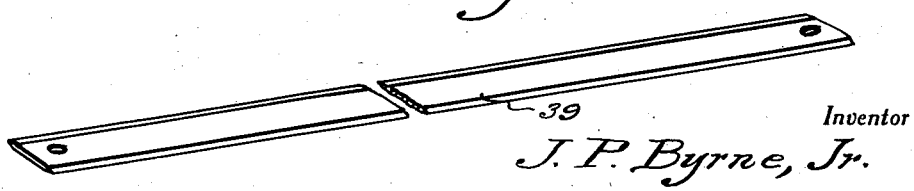
Inventor
J. P. Byrne, Jr.
By Clarence A. O'Brien
and Hyman Berman
Attorneys Patented May 28, 1940

2,202,443

UNITED STATES PATENT OFFICE 2,202,443

MOWER ATTACHMENT

James P. Byrne, Jr., Woodstock, N. Y., assignor of one-half to Robert J. Dwyer, New York, N. Y.

Application March 30, 1939, Serial No. 265,031

1 Claim. (Cl. 56—238)

This invention appertains to new and useful improvements in mower attachments and more particularly to an auxiliary cutter for cutting high growths.

The principal object of the present invention is to provide an auxiliary cutter for mowers such as lawn mowers, which can be applied and driven off of the usual cutter reel drive wheels without the medium or agency of any tensioning means or other pressure applying media.

Another object is to provide an auxiliary cutter for mowers which can be immediately removed from the mower, in instances where obstacles may be encountered, thus dispensing with the use of tools.

Another object is to provide an apparatus of the character stated which will be of simple construction, and low cost to manufacture, particularly in view of the fact that the parts involved are in most instances standard hardware which can be bought at present on the open market.

Another object is to provide an auxiliary cutter for mowers wherein the cutting blade assembly can be adjusted in length by rotating the assembly to increase or decrease the spiraliform of the blades.

Another important object of the invention is to provide an auxiliary cutter for cutting high growths on their approach to the usual mower cutting reel wherein the auxiliary cutter will be driven by either one or both of the usual mower drive wheels.

Still another important object of the invention is to provide an auxiliary cutter for mowers which can be readily adjusted and adapted for various sized mowers.

These and other objects and advantages of the invention will become apparent to the reader of the following specification.

In the drawings—

Figure 1 represents a top plan view of the appliance applied to a conventional mower.

Figure 2 is a section taken substantially on a line 2—2 of Figure 1.

Figure 3 is a longitudinal sectional view through one of the rollers.

Figure 4 is a perspective view of one of the thin blades.

Figure 5 is a fragmentary longitudinal sectional view through the auxiliary cutter shaft assembly.

Figure 6 is a perspective view of the roller bushing.

Figure 7 is a fragmentary side elevational view of one of the auxiliary cutter shaft sections.

Figure 8 is an enlarged sectional view on the line 8—8 of Figure 1.

Referring to the drawings, wherein like numerals designate like parts, it can be seen that numerals 5—5 represent the usual drive wheels of a conventional mower, such as a lawn mower. The usual handle bar is denoted by the numeral 6 and has the connecting straps 7 to the mower frame. The mower as shown in Figure 1 is illustrated in skeleton form, the cutter reel not being shown. However, the usual tie rod 8 is disclosed as this is employed as a hanger support for the auxiliary cutting means generally referred to by numeral 9.

The auxiliary cutter consists of a U-shaped frame made up of the two L-shaped sections 11—11 of angle construction with their adjacent ends disposed in interlapping relation as shown in Figure 1 and their opposite ends providing side arms 11'. A clamp 18 is disposed around the interlapping end portions to secure the same in definitely adjusted position, this of course depending upon the spaced relation of the drive wheels 5—5.

The hanger means for the frame 11—11 consists of a pair of hanger units generally referred to by numeral 13.

Each of these hanger units consists of a projection 15 which project laterally from the corresponding frame section 11.

A hook-shaped hanger element 20 has the threadedly bored head 21 which receives the threaded portion of the projection 15.

A plate 22 is swingably or rotatably mounted on the inner portion 16 of the projection 15 and the coiled compression spring 23a serves to normally urge the same in the direction of the hanger element 20. Obviously, when the entire auxiliary cutter 9 is to be removed, all that is required is to pull backwardly slightly on the plate 22 and rotate the same so that its lower end is removed from the lower portion of the corresponding hanger element 20, thus permitting the entire assembly 9 to be lifted off of the tie rod 8.

The shaft assembly of the auxiliary cutter consists of the tube 23 into the end portions of which are disposed the shaft sections 24—24. The ends of the tube 23 are externally threaded to accommodate the collars 25 and when these collars are properly placed on the ends of the tube 23, the collars and end portions of the tube 23 are tapped to accommodate set screws 26 which are driven against the corresponding shaft sections 24.

The end portions of the shaft sections 24 are journalled through bearings 27 in the reduced end portions of the frame members 11—11 and extend into the bushing 28 of the roller assembly generally referred to by numeral 29. Each of these roller assemblies consist of a shell 30 closed at its outer end as at 31, except for a small oil opening, and provided with the circumscribing roller annulus 32 of rubber or some other similar material. The roller end of each shaft section 24 extends through a bushing 28, the latter having a reduced extension disposed into the corresponding shell 30 and on which the shell is preferably shrunk. As shown in Figure 7, the shaft section 24 has a cross pin 34 which rides in and out of the cam cut outer end of the corresponding bushing 28. This cam end consists of low points 35 terminating adjacent high points 36 to define shoulders 37. A compression spring 38 is interposed between the closed end 31 of the shell 30 and the shaft 24, to maintain the parts in proper relation.

Obviously, when the mower is moved rearwardly, the auxiliary cutter will not operate, but when it is moved forwardly the cross pins 34 will drive the auxiliary cutter, due to the engagement of the same with the shoulders 37 of the bushing 28. Furthermore, one drive wheel 5 can operate and the other remain substantially stationary, as when the mower is being rotated, and still the auxiliary cutter will be operated.

It can be seen that the auxiliary cutter consists further of a pair of thin cutter blades 39, which are flexed into a substantially spiral form and have their ends secured to the lugs 40 on the corresponding ends of the cross arms 41 which are carried by the shaft sections 24. The intermediate portions of these cross arms 41 are provided with U-frames 42 for attaching the cross arms 41 to the shaft sections 24.

Obviously, by loosening the set screws 26, the blades 39, which are of thin yieldable material, can have their ends rotated in opposite directions to increase or decrease the spiraliform in length in accordance with the space to be spanned.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is—

A cutter reel assembly for attachment to a lawn mower having ground wheels and a transverse frame bar, said assembly comprising a reel-carrying frame including side arms, clamps on said frame for attaching the same to said bar, a cutter reel comprising a pair of flexible cutter bars opposed in spiralling relation, and means to mount said bars in said frame for flexing to vary the pitch thereof comprising a pair of stub shafts endwise slidable and rotatable in said arms, respectively, independently, a pair of cross arms fast on said shafts, respectively, and having the ends of said cutter bars fixed thereto whereby under endwise sliding and rotary adjustment of said shafts in opposite directions into different set positions, said blades may be twisted to vary the pitch thereof, means to lock said shafts together for unitary rotation to revolve said blades and against movement from set position comprising a tubular sleeve extending between said shafts and in which the latter are slidable and rotatable independently of each other and of said sleeve, said sleeve being provided with set screws therein for clampingly engaging said shafts, and means to impart rotation to said shafts comprising a pair of rollers thereon adapted to frictionally engage said wheels, respectively.

JAMES P. BYRNE, Jr.